Aug. 18, 1953  R. A. GAETANI ET AL  2,649,567
RADIO FREQUENCY IGNITION SYSTEM ANALYZER
AND INTERFERENCE LOCATOR
Filed Feb. 27, 1951

Inventors
ROBERT A. GAETANI
EDWIN C. VESTAL, Jr

By
Attorneys

Patented Aug. 18, 1953

2,649,567

UNITED STATES PATENT OFFICE 2,649,567

RADIO FREQUENCY IGNITION SYSTEM ANALYZER AND INTERFERENCE LOCATOR

Robert A. Gaetani, Norfolk, Va., and Edwin C. Vestal, Jr., United States Navy

Application February 27, 1951, Serial No. 213,036

4 Claims. (Cl. 324—15)

(Granted under Title 35, U. S. Code (1952), sec. 266)

The present invention relates to ignition system testing apparatus and more particularly to an ignition system testing apparatus for determining the condition of the harness and the wiring of ignition systems, especially those for aircraft engines.

An object of the present invention is the provision of ignition system testing apparatus for measuring the electrode spacing of the spark plugs of the system and to ascertain the firing condition of the plugs.

Another object is to provide ignition system testing apparatus for determining the condition of the shielding of the system.

A further object is the provision of ignition system testing apparatus having an auxiliary spark gap which is calibrated to indicate the spacing of the electrodes of the plugs of the system.

Still another object is to provide ignition system testing apparatus having an auxiliary spark gap and indicating means employing the null method of indication.

A still further object is to provide ignition system testing apparatus for determining the firing condition of the plugs and the condition of the shielding of the system.

An additional object is the provision of ignition system testing apparatus which is operable readily and rapidly without requiring operation of the engine.

Figure 1:
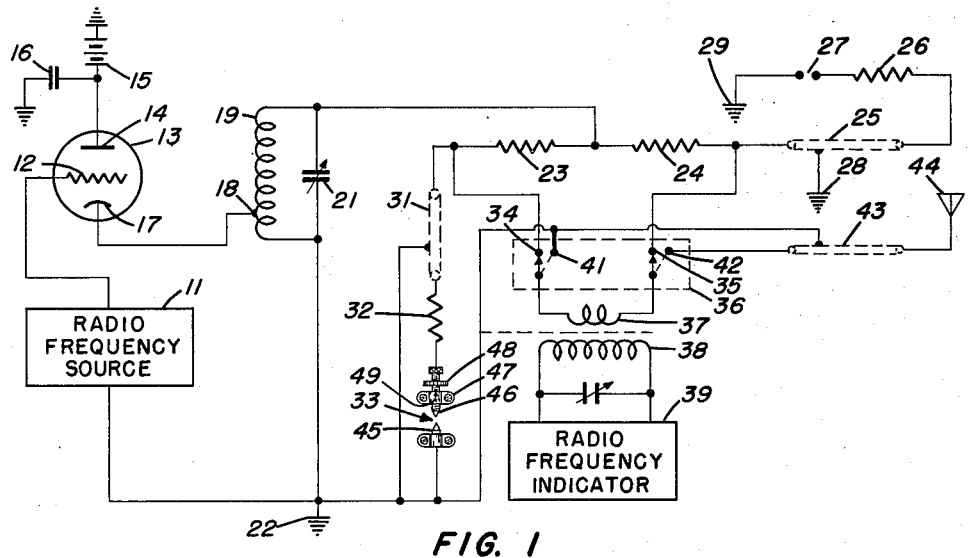
Figure 2:
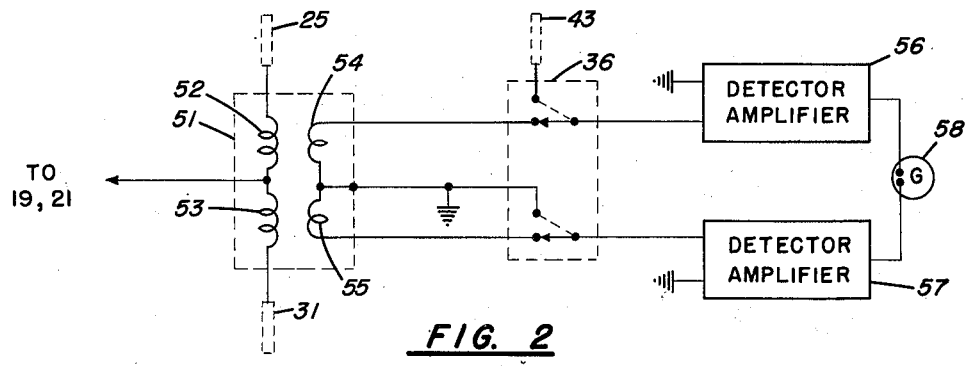

The exact nature of this invention as well as other objects and advantages thereof will readily be apparent from consideration of the following detailed description relating to the annexed drawing in which:

Fig. 1 is a schematic diagram of one embodiment of the apparatus according to the present invention; and Fig. 2 is a schematic diagram of a modification of a portion of the apparatus of Fig. 1.

Referring now to the drawings, wherein like reference characters designate like or corresponding parts throughout the several views, there is shown in Fig. 1, which illustrates a preferred embodiment, a source 11 of radio frequency power, source 11 being any conventional radio frequency oscillator.

Power from source 11 is applied to the grid 12 of power amplifier tube 13 whose plate 14 is connected to any suitable source of high voltage, indicated as battery 15. Plate 14 is by-passed to ground through capacitor 16 in the conventional manner.

Cathode 17 of tube 13 is connected to an intermediate point 18 on inductor 19. A variable capacitor 21 is connected across inductor 19 and capacitor 21 being grounded at 22.

The upper junction of capacitor 21 and inductor 19 is connected to the junction of resistors 23 and 24. The other end of resistor 24 is connected through shielded cable 25 to one end of resistor 26, the other end of resistor 26 being connected to the ungrounded electrode of spark plug 27. As shown in the drawing, the shield of cable 25 is grounded at 28, while the other electrode of plug 27 is grounded at 29, preferably through the frame of the engine.

Resistor 23 has the other end thereof connected through shielded cable 31 to one end of resistor 32, the other end of resistor 32 being connected to the ungrounded terminal of variable auxiliary spark gap 33. The shield of cable 31 is grounded at 22.

The said other ends of resistors 23 and 24 are connected to fixed contacts 34 and 35, respectively, of double-pole double-throw switch 36. The movable contacts of switch 36 are connected to opposite ends of inductor 37 which is magnetically coupled to input resonant circuit 38 of a conventional radio frequency indicator 39.

Switch 36 has a second pair of fixed contacts 41, 42, contact 41 being connected to ground at 22 and to the shield of shielded cable 43. Contact 42 is connected through cable 43 to a movable probe antenna 44.

In operation, the high voltage developed across resonant circuit 19, 21 is applied to a pair of load circuits. One load circuit comprises the series circuit of resistor 24, cable 25, resistor 26 and the spark gap 27 under test. The other load circuit comprises resistor 23, cable 31, resistor 32 and auxiliary gap 33. Resistors 26 and 32 are provided to reduce the loading on tube 13, and the criticalness of adjustment of gap 33.

With resistors 23 and 24 equal and resistors 26 and 32 equal, and with cable 25 electrically equivalent to cable 31, equal currents will flow in the load circuits if the setting auxiliary gap 33 is equivalent to the setting of gap 27 under test. Since these currents flow in opposite directions with respect to the common junction of resistors 23 and 24, the vector sum of the voltage drops across these resistors will be substantially zero, and a minimum voltage will be applied across inductor 37. Consequently, a minimum response will be produced in indicator 39.

Any inequality of the gap settings will produce an indication on indicator 39 of greater magnitude than the aforementioned minimum response, the magnitude of this indication being dependent upon the relative gap settings. Therefore, if gap 33 is adjusted until indicator 39 indicates a minimum response, the setting of gap 33 will be equivalent to that of the gap.

Gap 33 may be made adjustable and may be calibrated in any conventional manner. For example, gap 33 may comprise a fixed grounded terminal 45 and a movable terminal 46 mounted in support 47. Terminal 46 is provided with a scale 48 which may be read with respect to index 49 on support 47. Scale 48 may be calibrated to indicate either the effective electrode spacing or the allowable limits of spacing.

It is to be understood, of course, that the specific adjustable gap shown and described is merely illustrative, and that any other suitable gap arrangement may be utilized which will enable the operator to determine the condition of the gap under test. It is also understood that resistor 26 may be connected to the distributor, not shown, of the ignition system so that each plug may be tested by rotating the distributor through its cycle. In this case a variable equalizing capacity may be inserted between the junction of resistor 32 with the variable gap 33, and the ground 22, to compensate for the relatively high shunt capacity of the ignition harness being tested.

To determine the condition and effectiveness of the ignition shielding, switch 36 is moved to the dotted line position shown in Fig. 1, and gap 33 is opened fully to allow all of the developed power to be applied through the load circuit to the ignition system. In this position of switch 36, probe 44 is connected in series with inductor 37. By placing probe 44 in the vicinity of the engine or the ignition harness, any radio frequency energy leakage will be indicated on indicator 39. Thus, ignition interference may readily be detected and localized without operating the engine.

Referring now to Fig. 2, there is shown another embodiment of the present invention, wherein a coupling assembly, generally designated 51, is connected to resonant circuit 19, 21. Assembly 51 comprises a pair of inductors 52, 53, which replace resistors 23, 24. The free ends of inductors 52 and 53 are connected to cables 25, 31, respectively, while inductors 54 and 55 are magnetically coupled to inductors 52, 53, respectively.

The magnetic coupling between inductors 52 and 54 produces a radio frequency voltage in inductor 54 which is applied through switch 36 to detector amplifier 56. Similarly, the voltage produced in inductor 55 is applied through switch 36 to detector amplifier 57. Any suitable indicator, such as galvanometer 58, is connected between amplifiers 56 and 57 to indicate any unbalance in the outputs of the amplifiers, the direction and magnitude of the indication being dependent upon the relative gap settings.

The operation of the arrangement of Fig. 2 is similar to that of the arrangement of Fig. 1. It is apparent that inductors 54 and 55 may be a single inductor with a grounded center tap, or that these inductors may be ungrounded if used with the indicator of Fig. 1. It is further apparent that resistors 23 and 24 of Fig. 1 may be replaced by inductors 52 and 53 with the remainder of the arrangement of Fig. 1 the same.

It is thus seen that the present invention provides testing apparatus for readily and rapidly testing an ignition system to determine the condition of the spark gaps thereof. The apparatus also detects and localizes sources of radio interference due to faulty ignition shielding. Each of these functions is carried out without operating the engine. Finally, by utilizing the null balancing method, a readily operable and highly sensitive testing arrangement is attained.

Obviously many modifications and variations of the present invention are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

What is claimed is:

1. Apparatus for testing engine ignition systems, said apparatus comprising a source of radio frequency energy, a first load circuit and a spark gap under test coupled to said source for applying a portion of said energy across said spark gap, an auxiliary spark gap, a second load circuit coupled between said source and said auxiliarly spark gap for simultaneously applying a portion of said energy across said auxiliary spark gap, indicating means, switch means for selectively coupling said indicating means differentially across said load circuits so that a minimum response is obtained when said gaps are equal, and a probe antenna responsive to radio frequency energy, said switch means including means for selectively coupling said indicating means to said probe antenna and disconnecting said first and second load circuits from said indicating means.

2. Apparatus according to claim 1, and means for varying the spacing of said auxiliary spark gap so that when said auxiliary spark gap exceeds the spark gap under test, all the radio frequency energy is supplied to said gap under test thereby permitting said probe antenna when coupled to said indicating means to pick up stray radio frequency waves in the ignition system of which said spark plug gap is a part.

3. Apparatus for testing engine ignition systems, said apparatus comprising a source of radio frequency energy, an auxiliary spark gap, a first load circuit including an impedance coupled between said source and said auxiliary gap for applying energy to said auxiliary gap, a second load circuit including an impedance coupled between said source and a spark gap for simultaneously applying energy to said spark gap under test, said impedances having a common junction, indicating means, switch means for selectively coupling said indicating means across the series connection of said impedances, and a radio frequency responsive probe antenna, said switch means including means for selectively coupling said indicating means to said probe antenna.

4. Apparatus for testing engine ignition systems comprising a source of radio frequency energy, a first series circuit comprising a first impedance and an auxiliary spark gap, a second series circuit comprising a second impedance and a spark gap under test, means connecting said series circuits in parallel across said source, said first and second impedances having a common junction, indicating means, switch means for selectively coupling said indicating means across both of said impedances, and a radio frequency responsive probe antenna, and said switch means including means for selectively coupling said indicating means to said probe antenna.

ROBERT A. GAETANI.
EDWIN C. VESTAL, Jr.

References Cited in the file of this patent

UNITED STATES PATENTS

| Number | Name | Date |
|---|---|---|
| 1,465,352 | Dobson | Aug. 21, 1923 |
| 1,736,004 | Hack | Nov. 19, 1929 |
| 2,499,410 | Nupp | Mar. 7, 1950 |
| 2,594,138 | Elam | Apr. 22, 1952 |